No. 733,572. PATENTED JULY 14, 1903.
C. F. AXELSON.
ROD.
APPLICATION FILED APR. 17, 1901.
NO MODEL.
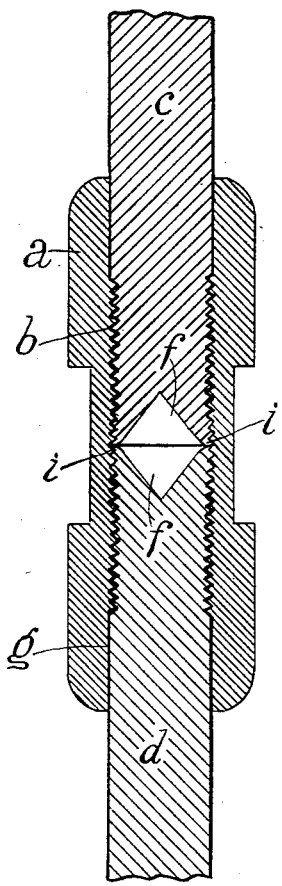
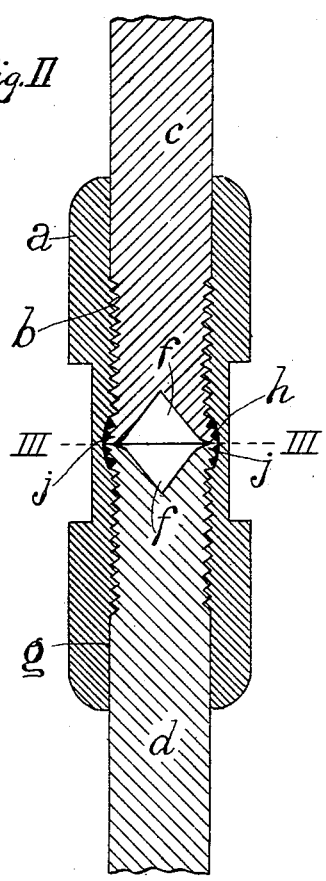
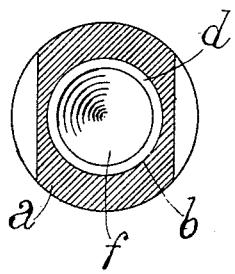
Witnesses
C. C. Holly.
J. Townsend
Inventor
Charles F. Axelson
by Townsend Bros
his atty No. 733,572. Patented July 14, 1903.

UNITED STATES PATENT OFFICE.

CHARLES F. AXELSON, OF LOS ANGELES, CALIFORNIA, ASSIGNOR OF ONE-HALF TO GUSTAVUS A. AXELSON, OF LOS ANGELES, CALIFORNIA.

ROD.

SPECIFICATION forming part of Letters Patent No. 733,572, dated July 14, 1903.

Application filed April 17, 1901. Serial No. 56,313. (No model.)

*To all whom it may concern:*

Be it known that I, CHARLES F. AXELSON, a citizen of the United States, residing at Los Angeles, in the county of Los Angeles and State of California, have invented a certain new and useful Improvement in Rods, of which the following is a specification.

This invention is especially designed for the manufacture of rods made up of a number of sections—such, for instance, as the sucker-rods of oil-well pumps and other pumps. The invention, however, is applicable for many different uses.

The object of this invention is to provide superior and extremely simple and economical means for coupling the sections together at normal temperature, so that they will be proof against accidental uncoupling under any ordinary conditions.

An object of this invention is to provide a coupling perfectly adapted for solid rods. In this relation each solid rod-section is recessed at the end, so that the rod terminates in a thin annular edge and the outside of the rod-section is screw-threaded from said annular edge for a sufficient distance to afford the required fastening, and an internally-screw-threaded coupling member is provided to receive the screw-threaded ends of the rod-sections. The screw-threaded portions are proportioned to stop the ends of the rod-sections at the middle of the coupling member.

The accompanying drawings illustrate the invention.

Figure I is a longitudinal fragmental sectional view of a sucker-rod embodying this invention. Fig. II is a like view of a modified form of this invention. Fig. III is a cross-section on line III III, Fig. II.

$a$ indicates a coupling member internally screw-threaded. $b$ indicates the screw-threaded hole of said coupling member.

$c$ $d$ indicate two screw-threaded rod members screwed into the coupling member and abutting against each other and being recessed in their ends by a recess $f$, respectively, and expanded at their ends.

The screw-threaded hole $b$ through the coupling member may be variously formed.
In the drawings a portion of the rod-receiving hole through the coupling is plain, as shown at $g$, being equal in diameter to the diameter of the rod member. In Fig. II the screw-threaded hole $b$ is shown enlarged at $h$ at a place intermediate the opposite ends of the screw-threads. This enlargement is preferably at the middle of the coupling member $a$, and the two rods $d$ and $c$ are screwed into the hole $b$ from the opposite ends of the coupling member $a$ and their recessed ends abut against each other at the place of said enlargement and are expanded into said enlargement of the screw-threaded hole. In practice the operation of expanding the ends of said rods $c$ and $d$ is accomplished by forcibly screwing the rods $c$ and $d$ into the coupling member $a$ after the ends of said rod members have come against each other, and the force of the screw is sufficient to upset the recessed ends in said coupling member, thus producing a friction which will prevent any accidental unscrewing under ordinary circumstances, but yet will allow the rod to be uncoupled when a great positive force is applied for that purpose.

It is to be understood that if it is desired to secure a single rod member $d$ in the screw-threaded hole this will be accomplished by screwing it into said hole and bringing its recessed end forcibly into contact with another member at the bottom of said hole, thus to accomplish the expanding of the end of the rod, as above stated.

In Fig. I the countersunk expanded ends $i$ are from the nature of the case but barely visibly expanded; but in Fig. II the expansion of the ends $j$ is readily discernible.

It is to be understood by reference to Fig. I that my invention does not depend upon the formation of any enlargement of the screw-threaded hole, for the reasons that there is a more or less appreciable space between the screw-threads of the hole and the screw-threads of the rod and that the forcible screwing together of the recessed ends of the rods will expand the ends so as to take up such space and produce a close engagement of the ends of the rods with the screw-threaded hole, thus producing a friction which will prevent any unscrewing except by the application of considerably-greater force than what would otherwise be effective to unscrew the parts.

The locking effect may be increased by producing the enlargement $j$, into which the end of the rod expands, whereupon the unscrewing force must not only overcome the friction produced by the expanded end, but must also return the swaged or upset expanded portion inward to again enter the screw-threaded portion of the hole.

What I claim, and desire to secure by Letters Patent of the United States, is—

A rod comprising a coupling member having a screw-threaded hole therein, said hole being enlarged at a place intermediate the opposite ends of the screw-threads; and two screw-threaded rod members screwed into said screw-threaded hole and recessed at their ends respectively and abutting against each other at said enlargement and expanded in said enlargement of the screw-threaded hole.

In testimony whereof I have signed my name to this specification, in the presence of two subscribing witnesses, at Los Angeles, California, this 10th day of April, 1901.

C. F. AXELSON.

Witnesses:
JAMES R. TOWNSEND,
G. A. AXELSON.